(12) United States Patent
Chiu

(10) Patent No.: US 10,747,262 B1
(45) Date of Patent: Aug. 18, 2020

(54) FOLDABLE STRUCTURE FOR POINT OF SALE

(71) Applicant: Senor Tech Co., Ltd., New Taipei (TW)

(72) Inventor: Hsin-Liang Chiu, New Taipei (TW)

(73) Assignee: SENOR TECH CO., LTD., New Taipei (TW)

( * ) Notice: Subject to any disclaimer, the term of this patent is extended or adjusted under 35 U.S.C. 154(b) by 0 days.

(21) Appl. No.: 16/502,940

(22) Filed: Jul. 3, 2019

(30) Foreign Application Priority Data

May 8, 2019 (TW) ............................. 108205662 U

(51) Int. Cl.
*G06F 1/16* (2006.01)
*G06Q 20/20* (2012.01)
(52) U.S. Cl.
CPC ........... *G06F 1/1601* (2013.01); *G06Q 20/20* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,003,008 A * | 12/1999 | Postrel | ..................... | G06F 1/183 235/381 |
| 6,053,410 A * | 4/2000 | Wike, Jr. | .................. | G06F 1/16 235/462.43 |
| 6,053,411 A * | 4/2000 | Nugent, Jr. | .......... | G07G 1/0018 235/462.43 |
| 6,053,412 A * | 4/2000 | Wike, Jr. | .................. | G06F 1/16 235/375 |
| 6,062,477 A * | 5/2000 | Wike, Jr. | .................. | G06F 1/16 235/383 |
| 6,062,478 A * | 5/2000 | Izaguirre | .................... | G06F 1/16 235/462.43 |
| 6,065,677 A * | 5/2000 | Lippert | ................ | G07G 1/0018 235/462.43 |
| 6,163,451 A * | 12/2000 | Chiu | ....................... | F16M 11/10 248/419 |
| 6,407,909 B1 * | 6/2002 | Kato | ........................ | G07G 1/12 248/919 |
| 6,487,068 B1 * | 11/2002 | Rahemtulla | ........... | G06F 1/1616 312/223.1 |

(Continued)

*Primary Examiner* — Lisa Lea-Edmonds
(74) *Attorney, Agent, or Firm* — Muncy, Geissler, Olds & Lowe, PC

(57) ABSTRACT

The present invention provides a foldable structure for a point of sale (POS). The foldable structure comprises: a screen, a back plate of which is provided with a screen mounting part; a connecting arm, two ends of which are respectively provided with a first mounting part and a second mounting part; a base, a side plate of which is provided with a base mounting part; a first rotating member, coupled between the screen mounting part of the screen and the first mounting part of the connecting arm; and a second rotating member, coupled between the base mounting part of the base and the second mounting part of the connecting arm. The first rotating member and the second rotating member are rotated, and the connecting arm is folded to expand the screen and the base into a desktop type or a pulled-up vertical type, or the connecting arm is folded to gather the base against the back plate of the screen to form a wall-mounted type.

2 Claims, 11 Drawing Sheets

(56) References Cited

U.S. PATENT DOCUMENTS

| | | | | |
|---|---|---|---|---|
| 7,274,557 | B2 * | 9/2007 | North | F16M 11/10 248/917 |
| 7,349,202 | B2 * | 3/2008 | Kano | G06F 1/16 248/179.1 |
| 8,693,194 | B2 * | 4/2014 | Nihashi | G06F 1/20 361/694 |
| 8,740,165 | B2 * | 6/2014 | O'Kasick | F16M 11/10 248/276.1 |
| 9,261,904 | B2 * | 2/2016 | Liu | G06F 1/1613 |
| 9,665,861 | B2 * | 5/2017 | Fernando | G06Q 20/203 |
| 9,829,118 | B2 * | 11/2017 | Whiteside | A47F 9/04 |
| 10,451,213 | B2 * | 10/2019 | Liang | F16M 11/10 |
| 2004/0245796 | A1 * | 12/2004 | Maierholzner | B60R 7/04 296/37.8 |
| 2006/0082958 | A1 * | 4/2006 | Fujiwara | H05K 5/0017 361/679.06 |
| 2006/0113382 | A1 * | 6/2006 | Singgih | F16M 11/10 235/383 |
| 2006/0279804 | A1 * | 12/2006 | Ishikawa | H04N 1/00129 358/474 |
| 2008/0023612 | A1 * | 1/2008 | Lum | F16M 11/10 248/371 |
| 2008/0048085 | A1 * | 2/2008 | Cox | F16M 11/18 248/415 |
| 2012/0018324 | A1 * | 1/2012 | Hale | F16M 11/041 206/320 |
| 2014/0236744 | A1 * | 8/2014 | Drew | F16M 11/045 705/17 |
| 2014/0324609 | A1 * | 10/2014 | Herring | G07G 1/0018 705/17 |
| 2014/0334082 | A1 * | 11/2014 | Wang | G06F 1/1637 361/679.3 |
| 2015/0077916 | A1 * | 3/2015 | Liu | G06F 1/1613 361/679.27 |
| 2015/0221187 | A1 * | 8/2015 | Cho | G07G 1/0018 235/7 R |
| 2016/0051067 | A1 * | 2/2016 | Law | F16M 11/041 361/679.22 |
| 2016/0120050 | A1 * | 4/2016 | Chen | G06F 1/16 361/679.01 |
| 2016/0147268 | A1 * | 5/2016 | Wang | G06F 1/182 361/679.21 |
| 2019/0018457 | A1 * | 1/2019 | Kim | E05D 5/10 |

\* cited by examiner

FOLDABLE STRUCTURE FOR POINT OF SALE

BACKGROUND

Technical Field

The present invention relates to a point of sale, and more particularly relates to a foldable structure for a point of sale.

Related Art

A point of sale (POS, which is also called EPOS, i.e., Electronics at the Point Of Sale in Europe) is an electronic system widely used in retailing, catering, hotels and other industries and having a main function of counting the sales, inventory and customer purchase behaviors of commodities. Through this system, operators can effectively improve the operational efficiency. It can be said that this system is an indispensable necessary tool for operating the modern retailing. However, due to the continuous expansion of POS applications, many manufacturers have changed the English "Point of Sale" to "Point of Service" (service-based endpoint sales system) at the present.

It is known that a traditional POS is a single-screen structure, and a screen for customers to watch is arranged at a fixed position of the POS, that is, the overall structure of the POS is fixed, so that the POS may be neither randomly matched with peripheral devices (such as a printer or a scanner) of different sizes for application, nor configured and used in different environments.

SUMMARY

In view of the above problems, the present invention is directed to provide a foldable structure for a point of sale (POS). The overall structure of the POS may be adjusted to be randomly matched with a combination of peripheral devices of different sizes and configured and used in different environments.

An embodiment of the present invention provides a foldable structure for a POS, comprising:

a screen, a back plate of which is provided with a screen mounting part;

a connecting arm, two ends of which are respectively provided with a first mounting part and a second mounting part;

a base, a side plate of which is provided with a base mounting part;

a first rotating member, coupled between the screen mounting part of the screen and the first mounting part of the connecting arm; and a second rotating member, coupled between the base mounting part of the base and the second mounting part of the connecting arm, wherein the first rotating member and the second rotating member are rotated, and the connecting arm is folded to expand the screen and the base into a desktop type or a pulled-up vertical type, or the connecting arm is folded to gather the base against the back plate of the screen to form a wall-mounted type.

According to the embodiment of the present invention, each of the first rotating member and the second rotating member is a hinge or a stepping motor.

According to the embodiment of the present invention, the POS is of a wall-mounted type structure, and the base is locked to a wall mounting rack so as to be mounted on a wall.

DETAILED DESCRIPTION

In order to make the present invention more familiar to those of ordinary skill in the art to which the present invention pertains, exemplary embodiments of the present invention are particularly listed below, and the present invention and desired effects are described in detail in conjunction with the accompanying drawings.

Figure 1:
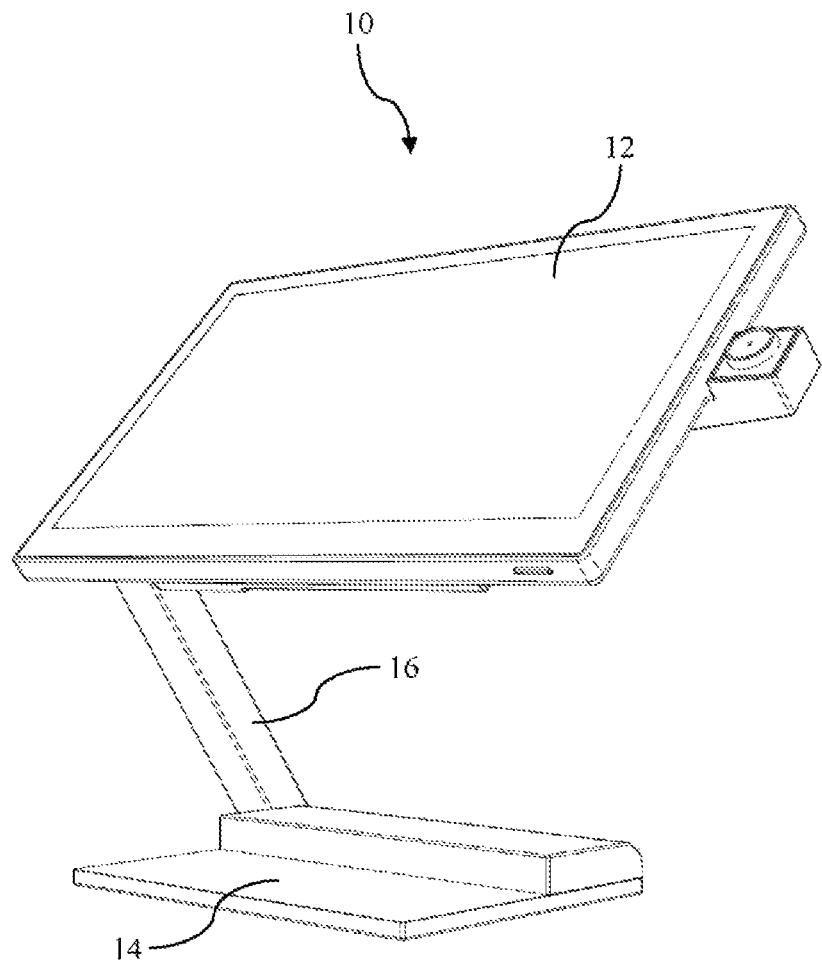
FIG. 1 is a three-dimensional diagram of a point of sale (POS) of the present invention.
Figure 2:
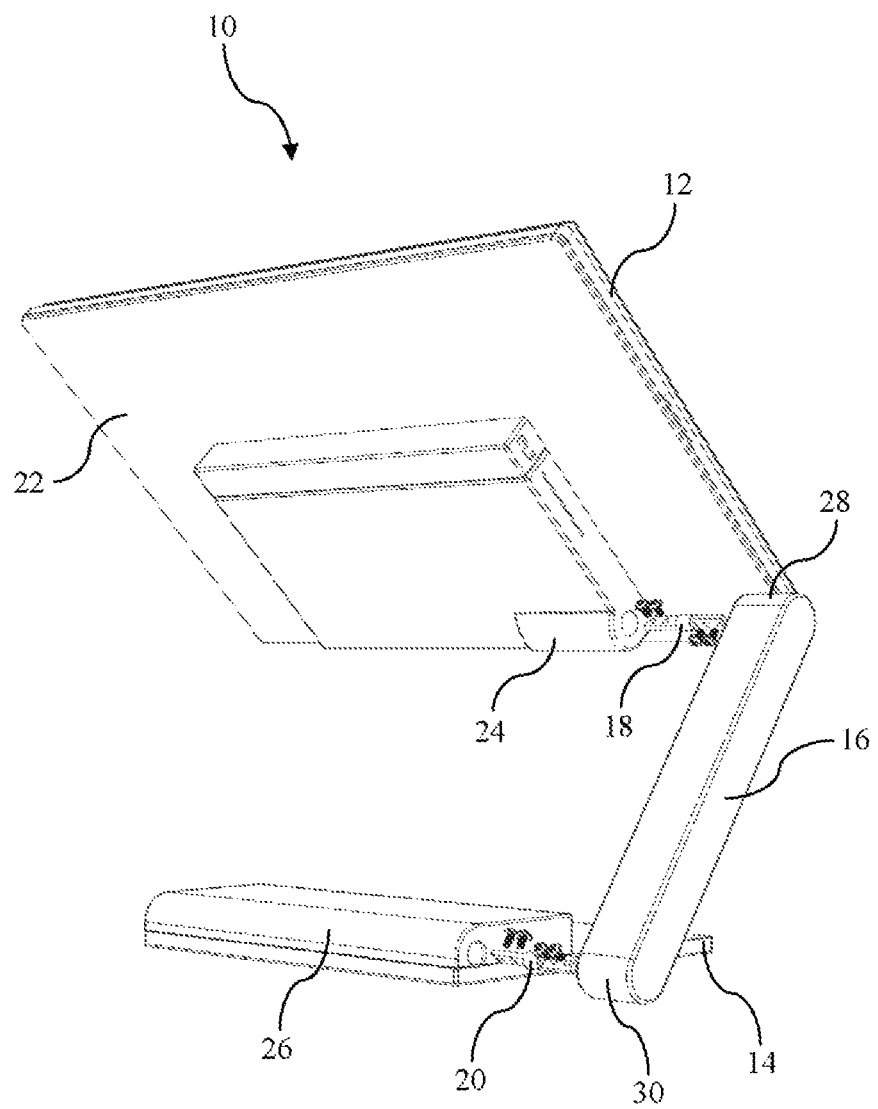
FIG. 2 is a partially structural exploded diagram of a POS of the present invention.

FIG. 1 is a three-dimensional diagram of a point of sale (POS) of the present invention, and FIG. 2 is a partially structural exploded diagram of a POS of the present invention. In FIGS. 1 and 2, a foldable structure for a POS 10 comprises a screen 12, a base 14, a connecting arm 16, a first hinge 18 serving as a first rotating member and a second hinge 20 serving as a second rotating member. In this embodiment, the first rotating member and the second rotating member of the present invention are not only limited to hinges, but also may be devices having rotating functions, such as a stepping motor.

A back plate 22 of the screen 12 is provided with a screen mounting part 24. An opening is formed in the screen mounting part 24. A side plate of the base 14 is provided with a base mounting part 26. An opening is formed in the base mounting part 26. Two ends of the connecting arm 16 are respectively provided with a first mounting part 28 and a second mounting part 30. An opening is formed in each of the first mounting part 28 and the second mounting part 30.

Two ends of the first hinge 18 are respectively inserted into the opening of the screen mounting part 24 and the opening of the first mounting part 28, and the first hinge 18 is locked between the screen mounting part 24 of the screen 12 and the first mounting part 28 of the connecting arm 16 via a screw. Two ends of the second hinge 20 are respectively inserted into the opening of the base mounting part 26 and the opening of the second mounting part 30, and the second hinge 20 is locked between the base mounting part 26 of the base 14 and the second mounting part 30 of the connecting arm 16 via a screw.

Figure 3A:
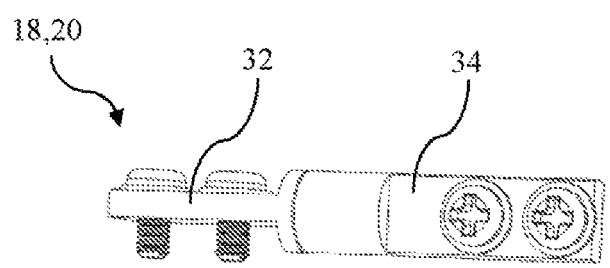
FIGS. 3A to 3C are schematic diagrams of rotations of hinges of the present invention.
Figure 3B:
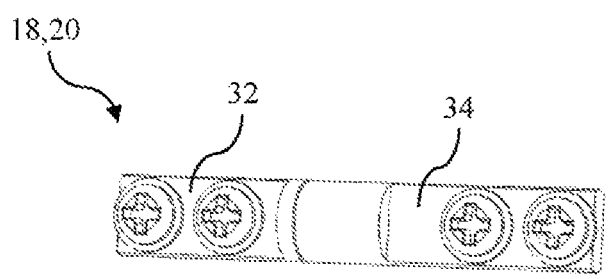
Figure 3C:
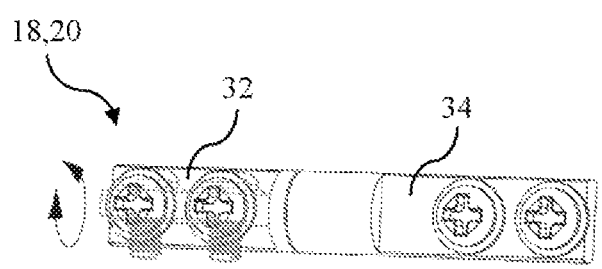

FIGS. 3A to 3C are schematic diagrams of rotations of hinges of the present invention. The first hinge 18 and the second hinge 20 both have first rotating parts 32 and second rotating parts 34. In FIG. 3A, the first rotating part 32 and the second rotating part 34 are perpendicular with respect to each other in 90 degrees. In FIG. 3C, the first rotating part 32 (or the second rotating part 34) is clockwise or counter-clockwise rotated to allow the first rotating part 32 and the second rotating part 34 which are perpendicular with respect to each other in 90 degrees to be horizontally facing the same direction. However, the first rotating part 32 and the second rotating part 34 of the present invention are not limited to the perpendicular state or horizontal state. The first rotating part 32 and the second rotating part 34 may be rotated with respect to each other in any angle.

Figure 4:
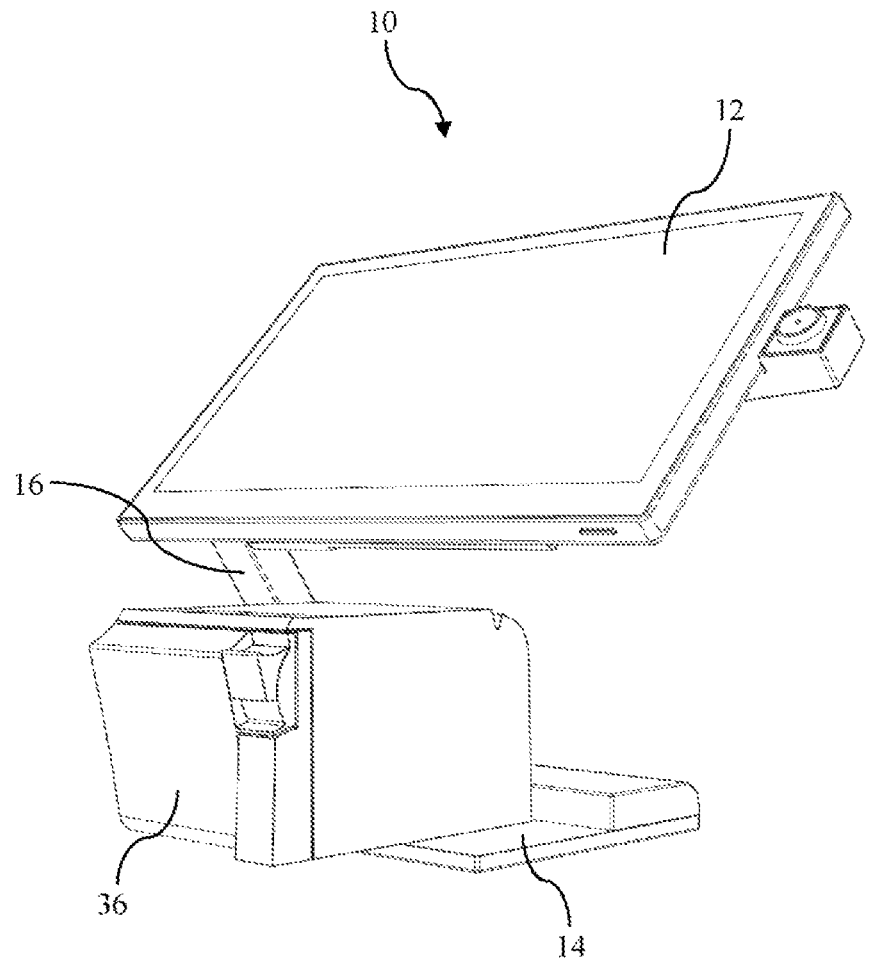
FIG. 4 is a three-dimensional diagram of the combination of a POS and the peripheral device of the present invention.

FIG. 4 is a three-dimensional diagram of the combination of a POS and the peripheral device of the present invention. In FIG. 4, the first hinge 18 is rotated to fold the screen 12 and the connecting arm 16 to allow the screen 12 in an angle for a user to watch, and then the second hinge 20 is rotated to fold the base 14 and the connecting arm 16 so that the screen 12, the base 14 and the connecting arm 16 can be expanded into a desktop type, and a peripheral device 36 is arranged between the screen 12 and the base 14.

Figure 5:
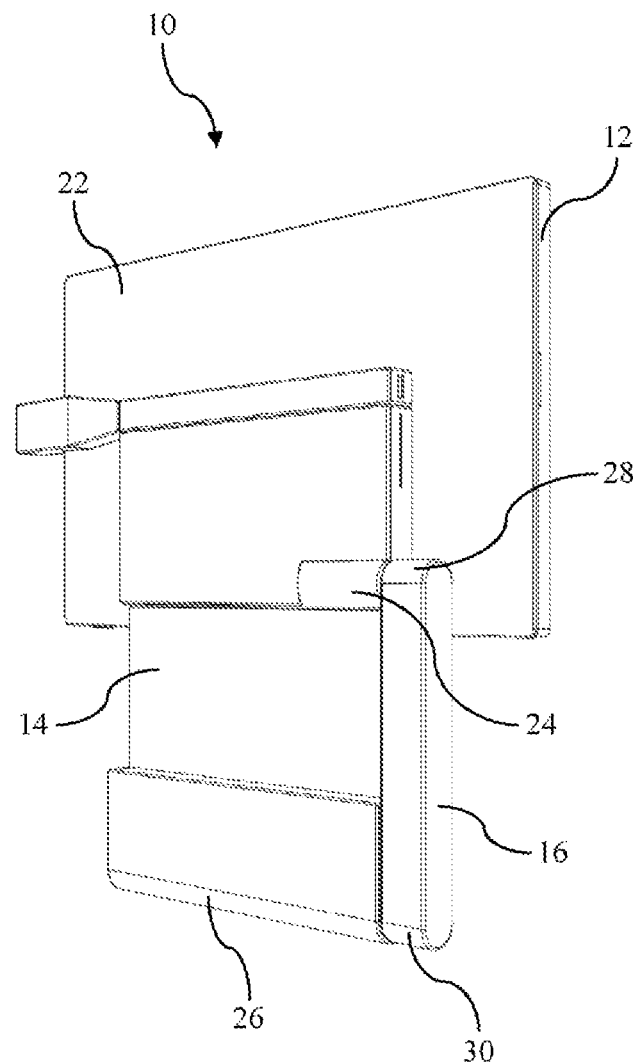
FIG. 5 is a three-dimensional diagram of a POS of the present invention in pulled-up vertical type.

FIG. 5 is a three-dimensional diagram of a POS of the present invention in pulled-up vertical type. In FIG. 5, the first hinge 18 is rotated to fold the screen 12 and the connecting arm 16 to allow the screen 12 to be vertical and allow the connecting arm 16 to be parallel to the screen 12 and stand upright; the second hinge 20 is rotated to fold the base 14 and the connecting arm 16 to allow the base 14 to be parallel to the screen 12 and stand upright with the connecting arm 16, thereby expanding the screen 12, the base 14 and the connecting arm 16 into a pulled-up vertical type.

Figure 6:
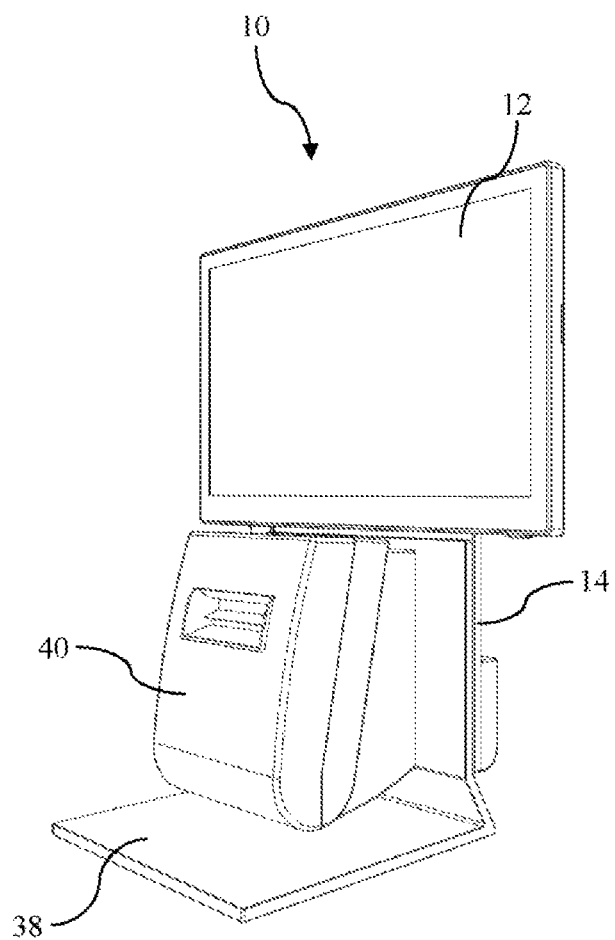
FIG. 6 is a three-dimensional diagram of the combination of a POS and the peripheral device of the present invention.

FIG. 6 is a three-dimensional diagram of the combination of a POS and the peripheral device of the present invention. In FIG. 6, the upright base 14 is fixed on a perpendicular plane of an L-shaped base plate 38, and a peripheral device 40 is fixed on the other perpendicular plane of the L-shaped base plate 38, so as to combine the pulled-up vertical type POS 10 with the peripheral device 40 via the L-shaped base plate 38.

Figure 7:
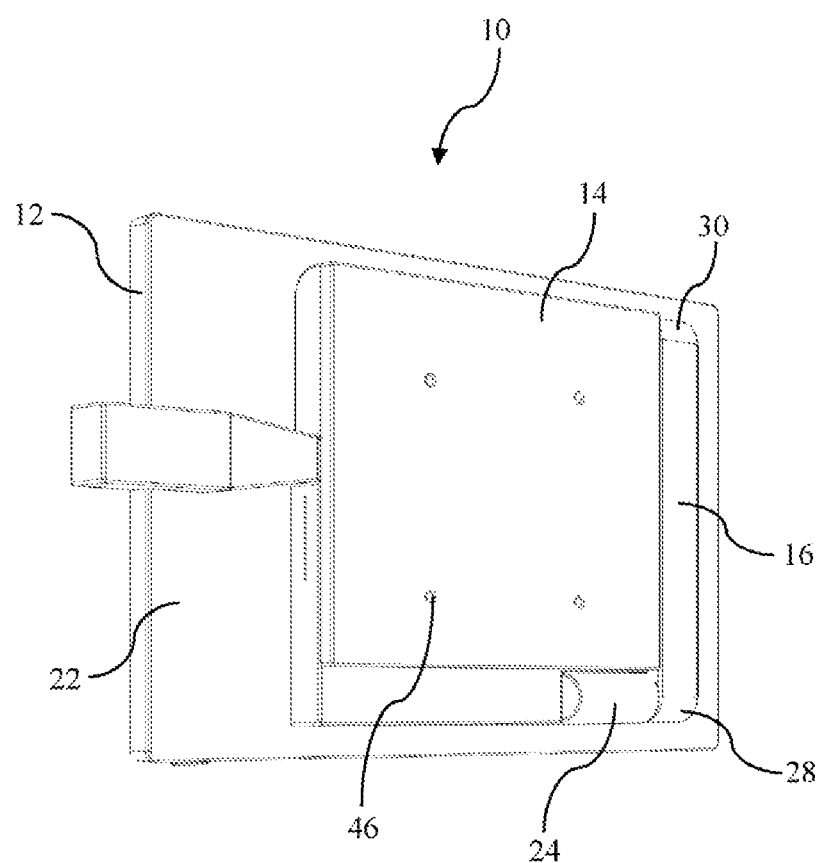
FIG. 7 is a three-dimensional diagram of a POS of the present invention in wall-mounted type.

FIG. 7 is a three-dimensional diagram of a POS of the present invention in wall-mounted type. In FIG. 7, the first hinge 18 is rotated to fold the screen 12 and the connecting arm 16 to allow the connecting arm 16 to abut against the back plate 22 of the screen 12, and then the second hinge 20 is rotated to fold the base 14 and the connecting arm 16 to allow the base 14 to abut against the back plate 22 of the screen 12, thereby gathering the screen 12, the base 14 and the connecting arm 16 to be a wall-mounted type.

Figure 8:
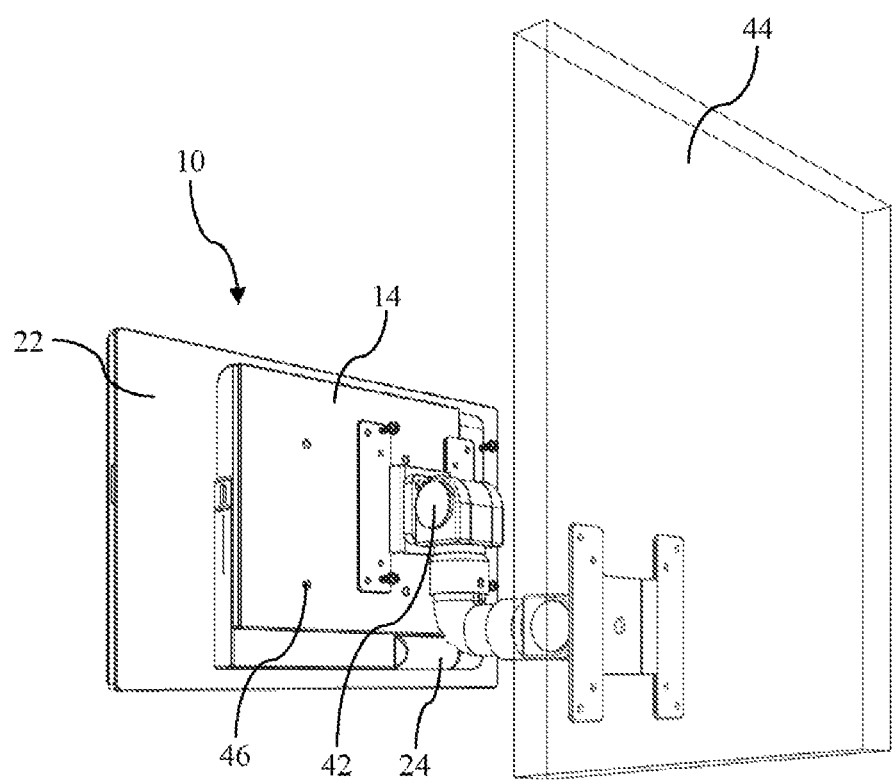
FIGS. 8 and 9 are schematic diagrams of a POS of the present invention mounted on a wall.
Figure 9:
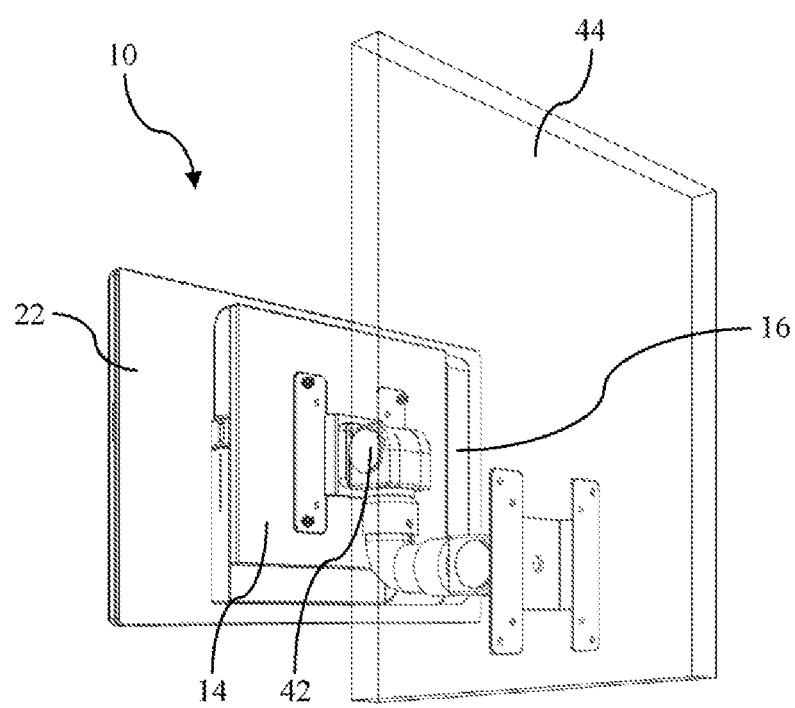

FIGS. 8 and 9 are schematic diagrams of a POS of the present invention mounted on a wall. In FIGS. 8 and 9, a wall mounting rack 42 is arranged on a wall 44. The wall mounting rack 42 is locked into a screw hole 46 of the base 14 via a screw so as to mount the POS 10 on the wall 44.

The foldable structure for the POS, provided by the present invention, has the characteristic that the overall structure of the POS may be adjusted to be randomly matched with a combination of the peripheral devices of different sizes and configured and used in different environments.

Although the present invention has been described above with reference to the exemplary embodiments and illustrative drawings, they shall not be considered as limitations. Those skilled in the art can make various modifications, omissions and changes to the shape of the present invention and contents of the specific examples without departing from the scope of claims of the present invention.

DESCRIPTION OF THE REFERENCE NUMERALS

10: POS
12: Screen
14: Base
16: Connecting arm
18: First hinge
20: Second hinge
22: Back plate
24: Screen mounting part
26: Base mounting part
28: First mounting part
30: Second mounting part
32: First rotating part
34: Second rotating part
36: Peripheral device
38: L-shaped base plate
40: Peripheral device
42: Wall mounting rack
44: Wall
46: Screw hole

What is claimed is:

1. A foldable structure for a point of sale (POS), comprising:
   a screen, a back plate of which is provided with a screen mounting part;
   a connecting arm, two ends of which are respectively provided with a first mounting part and a second mounting part;
   a base, a side plate of which is provided with a base mounting part;
   a first hinge having a first end inserted into an opening in the first mounting part of the connecting arm and a second end inserted into an opening of the screen mounting part of the screen; and
   a second hinge having a first end inserted into an opening in the second mounting part of the connecting arm and a second end inserted into an opening in the base mounting part of the base,
   wherein the first rotating member and the second rotating member are rotated, and the connecting arm is folded to expand the screen and the base into a desktop type or a pulled-up vertical type, or the connecting arm is folded to gather the base against the back plate of the screen to form a wall-mounted type.

2. The foldable structure according to claim 1, wherein the POS is of a wall-mounted type structure, and the base is locked to a wall mounting rack so as to be mounted on a wall.

* * * * *